Figure 1:
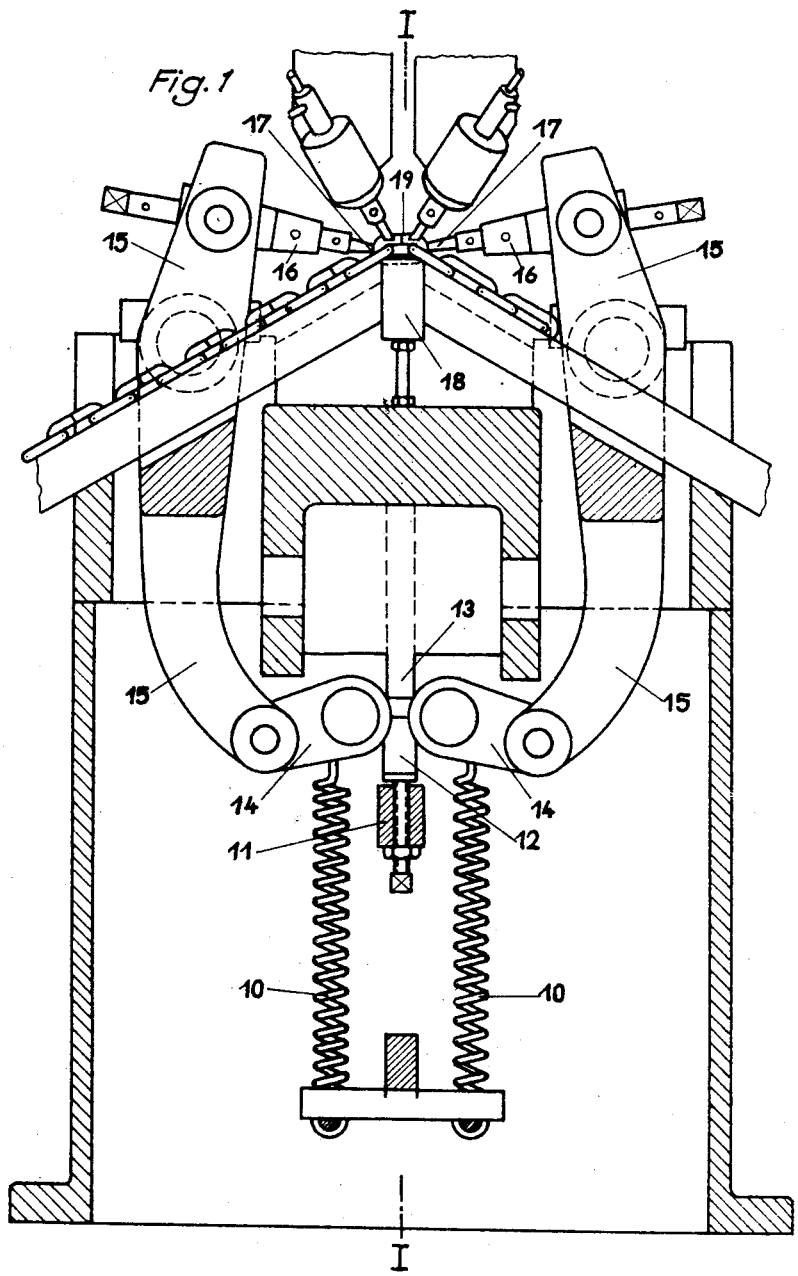

July 20, 1954  P. ESSER ET AL  2,684,422
CHAIN WELDING MACHINE
Filed April 17, 1951　　　　　　　　　　　4 Sheets-Sheet 2

Inventors
P. Esser
H. Stützer
A. Gremm

July 20, 1954  P. ESSER ET AL  2,684,422
CHAIN WELDING MACHINE
Filed April 17, 1951  4 Sheets-Sheet 4

Inventors
P. Esser
H. Stutzer
A. Gremm
By [signature]
Attys.

Patented July 20, 1954

2,684,422

UNITED STATES PATENT OFFICE 2,684,422

CHAIN WELDING MACHINE

Paul Esser, Koln-Raderberg, Hans Stützer, Koln-Bickendorf, and Alfred Gremm, Koln-Sulz, Germany, assignors to Meyer, Roth & Pastor, Koln-Raderberg, Germany Application April 17, 1951, Serial No. 221,428

Claims priority, application Germany April 26, 1950

3 Claims. (Cl. 219—4)

This invention relates to chain welding machines for resistance-butt welding providing for automatic switching off of the welding current and having means for pressing together the link ends to be welded during the welding operation.

Such welding machines generally operate as follows: The chain to be welded is led into the machine and the link on the welding support with the butt joint at the top is held and the joint pressed together by upsetting jaws under spring pressure. The spring pressure is set at such value that the ends are held in close contact until the welding temperature is reached, under current supplied to the link ends by electrodes. When this temperature is reached, the link is so softened, that a welding lever incorporated in the machine and by the aid of which the upsetting pressure is applied, can move down on to a stop provided for it, thereby switching off the welding current; at the same time the operating and feed mechanism is clutched to the drive. This is important because the duration of the welding operation may vary, being affected by the presence of foreign matter in the joint gap or on the surface of the material of the link.

Thereafter the ridge at the weld is pressed back to the original diameter of the wire, the chain link is released and the next vertically standing link is fed on to the welding support. The links which are horizontal in this passage of the chain are welded during a second passage of the chain through the machine.

In particular in the manipulation of heavy chains of rolled wire, unavoidable differences in the hardness and length of the links become apparent already on the bending machine on account of non-uniformity of the material, both in composition and in diameter. These have an undesirable effect on the operation of the welding machine; for example with too hard or too long links, the spring tension may not suffice to pull the welding lever down on its stop, whereas with short and softer links the lever may be drawn down before full welding temperature is reached and cause the welding current to be switched off so that the link ends may not be properly welded.

An object of the invention is to provide a machine of the kind described above with means controlled by the temperature of the link ends independently of the softening effect of the heat produced by the welding current, said means switching off the welding current when a determined welding temperature is reached.

Another object of the invention is to provide a machine of the kind described above with means actuated at the time the welding current is switched off, for increasing the pressure pressing the link ends together.

These objects may be attained according to the invention by providing a chain welding machine of the kind described above, with a photo-electric device for measuring the temperature at the weld, by the aid of which control operations consisting in switching off the welding current and actuating means for increasing the pressure on the link ends are set in action when a determined welding temperature is reached.

Advantageously this is effected by throwing an image, the same each time, of the weld region, formed by an optical system, on to a photoelectric cell, the resulting electrical change in which (resistance or voltage output according to the type of cell) when welding temperature is reached serves to set in action the control operations.

In a still more sensitive arrangement radiation from the weld location is thrown through a suitable light filter on to a photoelectric cell, the resulting electrical change in which, when welding temperature is reached serves to set in action the control operations.

A photoelectric measuring device gives a very sensitive measurement of temperature, because the total radiation increases as the fourth power, and the radiation maximum which alone is measured when a suitable light filter is used, increases as the fifth power of the temperature. It thus becomes possible to control a sensitive relay directly from the photo current, which relay sets in action the control operations.

Still more advantageous is an arrangement in which the change in resistance or voltage output of the photocell is used to change the balance of an associated bridge circuit, the output of which constitutes a signal for setting the control operations in action.

In order to enable the chain welding machine to deal with different kinds of steel and different diameters of the link wire, the temperature at which the control operations are initiated should be adjustable. For this purpose a regulating device is provided, for example between the photocell and the associated bridge circuit. In the simplest case this may be a variable resistance or voltage regulator (sliding resistance or potentiometer) which can be calibrated in degrees of temperature.

Figure 2:
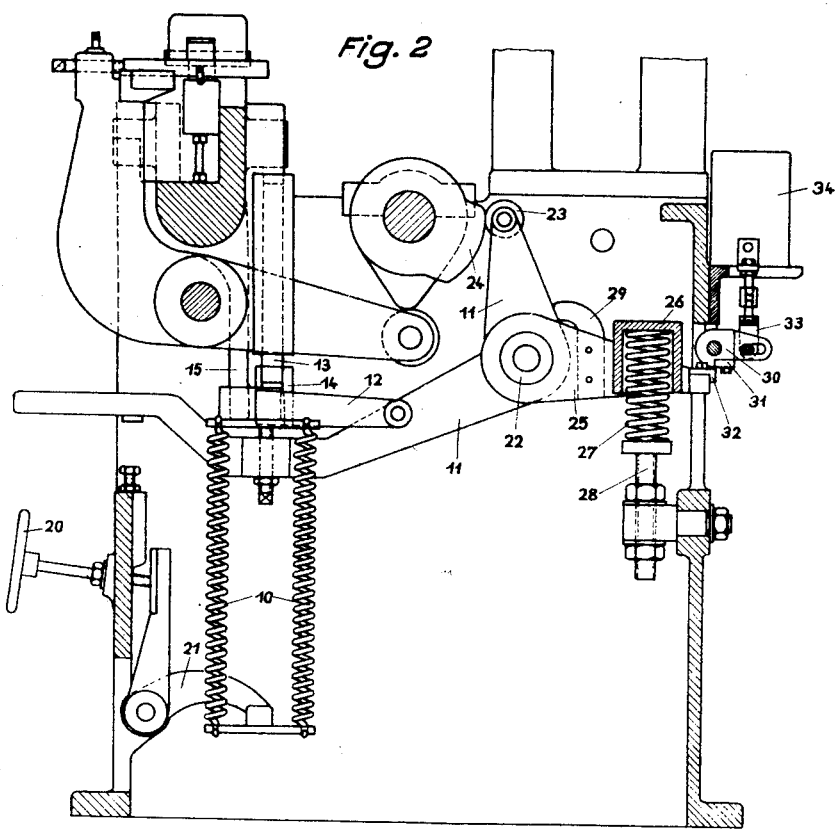
Figure 3:
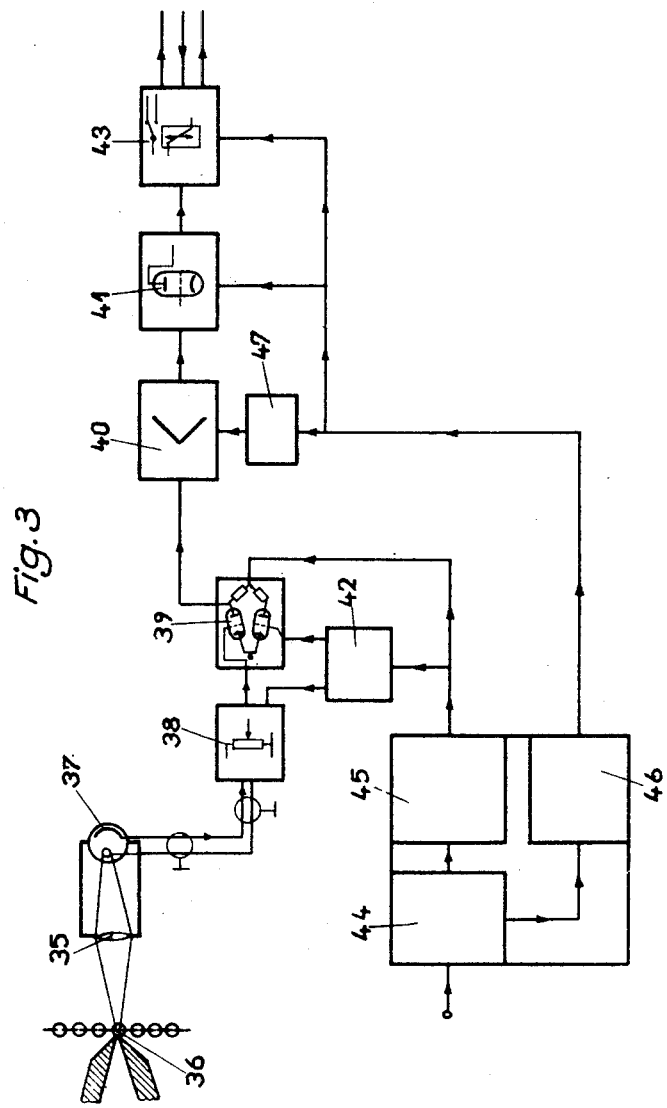
Figure 4:
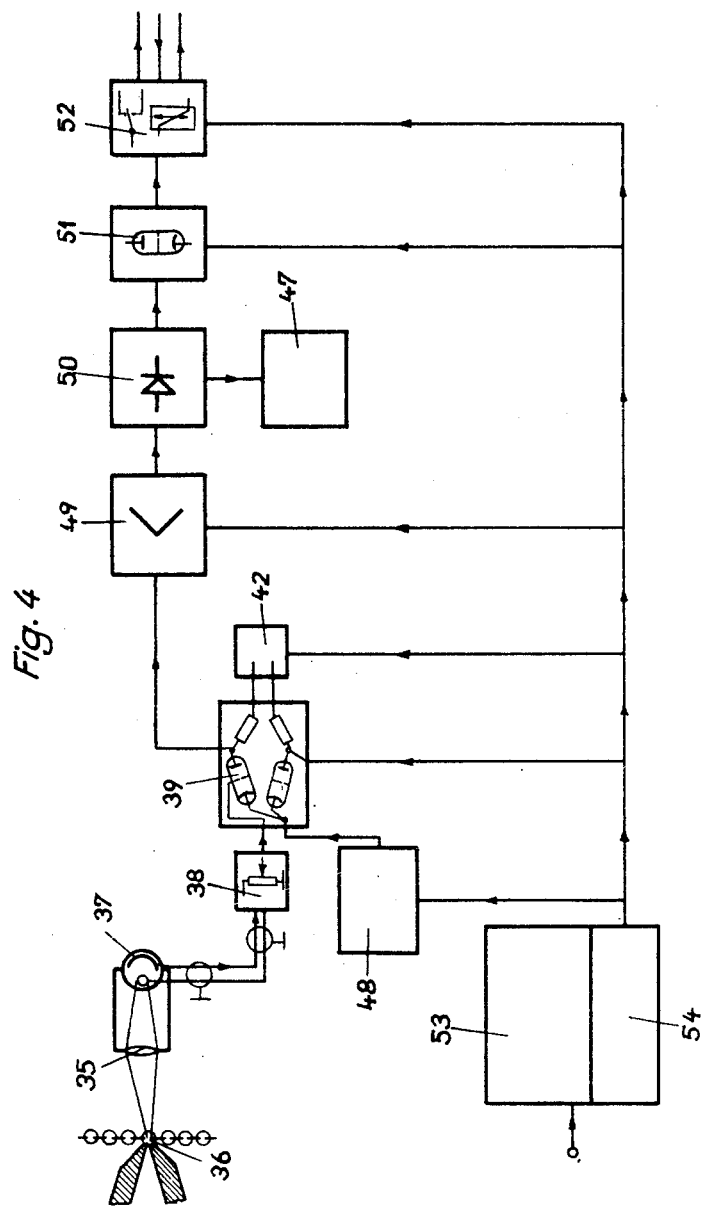

Further details of the invention will be described with reference to the accompanying drawings in which Fig. 1 is a front view partially in section, of part of a known chain welding machine, Fig. 2 is a section on the line I—I of Fig. 1 showing the means provided by the invention for increasing the upsetting pressure when the welding current is switched off, Fig. 3 is a block diagram of the photoelectric control circuit incorporating a direct current amplifier, and Fig. 4 is a block diagram of the photoelectric control circuit using an auxiliary alternating supply and an alternating current amplifier.

In the schematic Fig. 1, 10 are the springs which through the welding lever 11, an adjusting lever 12, a slider 13, links 14, upsetting levers 15 and jaw holders 16, press the upsetting jaws 17 against the chain link 19 resting on the welding support 18, thus pressing the ends firmly together to obtain good conductive contact.

In Fig. 2 which is a vertical section taken at right angles to Fig. 1, in addition to hand-wheel 20 and a loading lever 21 are shown, which serve for adjusting the springs 10. So far the construction illustrated is on known lines.

To produce the additional strong pressure on the upsetting jaws 17 at the termination of the heating period and the switching off of the welding current, the machine has the following provision. On the hub 22 of the two-armed welding lever 11, of which one arm is provided with a roller 23 which cooperates with a cam swell 24, a further arm 25 is rotatably mounted. This arm 25 incorporates a socket 26 acting as an abutment for a powerful spring 27 which can be adjusted by an adjusting screw 28. A lug 29 is secured to the arm 25, and its end can engage the arm of the welding lever 11 which carries the roller 23 so that when the roller runs on the cam swell 24 the spring 27 is loaded.

When the roller 23 of the welding lever 11 runs off the cam swell 24, during the welding operation in consequence of the tension of the springs 10, the arm 25 rotatable upon the hub 22 of the welding lever 11 is held back by a check lever 30, a stop 31 on which engages a stop 32 of the arm 25, until the welding temperature is reached. The check lever 30 is pivoted to the frame of the machine and is coupled to a lifting magnet by an adjustable link 33. As soon as the electric control circut gives the signal to switch off the welding current, the lifting magnet 34 is also excited and releases the arm 25. Thus through the arm 25 and lug 29 the spring 27 exerts a strong additional pressure on the welding lever 11 and through the above described mechanical elements upon the upsetting jaws 17 and through these upon the link ends just welded.

The temperature necessary for welding the link ends is according to the kind of steel and diameter of the wire from 1200 to 1500° C. In Figure 3 is shown in the form of a simple block diagram a measuring and control circuit which is adapted to initiate the necessary control operations, that is the switching off of the welding current and the exertion of the additional pressure on the link ends. By the aid of an optical system represented as a simple lens 35 an image of the weld location 36 is projected on to a photoelectric cell 37. By the aid of a temperature regulator 38 in the form of a voltage regulator which can be calibrated in degrees of temperature, part of the voltage generated in the cell 37 is applied to the grid of an electronic tube 39. The electronic tube 39 is in one arm of a bridge circuit, of which the two pairs of arms each consist of an electronic tube and an ohmic resistance.

With the bridge balanced there is no voltage across the null diagonal; but if the bridge balance is upset by illumination of the photocell 37 a D. C. voltage is applied to the grid of an amplifier tube 40, which voltage, amplified by this tube, is used to initiate the operation of an ionic tube 41 (mercury vapour rectifier or gas triode). The anode current of the tube 41 then serves to operate a relay 43 which through a circuit breaker switches off the welding current and switches an exciting current on to the lifting magnet 34.

Balancing of the bridge is effected by the aid of a regulator 42 which is supplied from ordinary supply mains through a mains unit 44 and stabiliser 45, and which acts upon the grid of the second electronic tube in the bridge. The supply to the tube 40 is controlled by the aid of a measuring instrument 47 bearing a calibration mark and supplied from unit 44 through a stabiliser 46. Another form of circuit is shown in Figure 4. Optical system 35, photocell 37, temperature regulator 38 and the bridge circuit with the tube 39 as well as the regulator 42 for balancing the bridge are generally the same as in Figure 3. By means of an alternating current generator 48 which, for example, generates an audible frequency of 800 to 1000 C. P. S., an auxiliary alternating current is fed into the bridge which when the bridge is balanced does not appear across the null diagonal.

When the balance of the bridge is upset by illumination of the photocell 37 a voltage of audible frequency is applied to the alternating current amplifier 49 the output of which after rectification at 50 is used to initiate the operation of an ionic tube 51 the anode current of which actuates a relay 52 whereby the control operations are set in action. Here again an instrument 47 is provided for adjusting the bridge balance.

Corresponding with the illustration of the circuits as simple block diagrams the leads for Figures 3 and 4 are only shown for one pole. If in accordance with Figure 4 an alternating current amplifier is used it is desirable to stabilise the mains unit 53 which is fed from alternating current mains by means of a stabiliser for example a glow discharge tube stabiliser 54 in order to avoid harmful effects due to variations in the mains supply. This arrangement permits particularly reliable operation since the individual voltages and currents of the tubes are independent of one another and accidental changes in operating conditions do not have effects of the same extent as in the case of direct current amplification.

We claim:

1. In a machine for electric resistance buttwelding of chain links, the combination of means including a supply circuit for supplying welding current to the ends of a chain link, means including a welding lever for pressing the link ends together during the welding operation, means for temporarily increasing the pressure applied to said link ends by said pressing means, said lastnamed means comprising an arm movable in relation to but adapted to engage said welding lever in the direction of movement in which it applies pressure to the link ends, spring means urging said arm in the lever-engaging direction, and means normally holding said arm back against the pressure of said spring means, a photoelectric device responsive only to the temperature of the weld area at the ends of said link, and means controlled solely by said photoelectric device for simultaneously interrupting said supply circuit and for releasing said holding means for actuating said pressure increasing means, whereby the welded ends of said links are held under increased pressure during the cooling of the weld.

2. A chain welding machine in accordance with claim 1 wherein said holding means comprises a check lever, and said releasing means comprises a magnet the excitation of which is controlled by the photo-electric device.

3. A chain welding machine in accordance with claim 1, wherein said photo-electric device includes a photo-electric cell having a voltage output, and wherein the means controlled by said photo-electric device comprises an auxiliary source of alternating current, a bridge circuit energized by said source and by said cell, an alternating current amplifier for the output of said bridge circuit, an ionic tube whose operation is initiated by the output of said amplifier, and a relay connected in the anode circuit of said ionic tube, the bridge circuit being balanced when no welding current flows so that there is no input to the amplifier until the bridge is thrown out of balance by illumination of said photo-electric cell.

References Cited in the file of this patent

UNITED STATES PATENTS

| Number | Name | Date |
|---|---|---|
| 1,975,753 | Delano | Oct. 2, 1934 |
| 2,076,220 | Bennett | Apr. 6, 1937 |
| 2,233,617 | Lamb | Mar. 4, 1941 |
| 2,277,848 | Delano | Mar. 31, 1942 |
| 2,464,752 | Seeloff | Mar. 15, 1949 |